United States Patent
Cobb

[19]

[11] Patent Number: 6,011,840
[45] Date of Patent: *Jan. 4, 2000

[54] TELEPHONE ACCESSORY INCORPORATING DEMAND METER FOR MULTIPLE USERS

[76] Inventor: Brant Cobb, P.O. Box 806, Timpson, Tex. 75975

[ * ] Notice: This patent issued on a continued prosecution application filed under 37 CFR 1.53(d), and is subject to the twenty year patent term provisions of 35 U.S.C. 154(a)(2).

[21] Appl. No.: 08/954,319

[22] Filed: Oct. 17, 1997

[51] Int. Cl.[7] .............................. H04M 1/66; H04M 3/00
[52] U.S. Cl. ......................... 379/199; 379/192; 379/200; 379/445
[58] Field of Search ................................... 379/199, 200, 379/192–198, 353–355, 455, 93.02, 93.03, 445, 190, 201

[56] References Cited

U.S. PATENT DOCUMENTS

| | | | |
|---|---|---|---|
| 5,200,995 | 4/1993 | Gaukel et al. | 379/188 |
| 5,274,698 | 12/1993 | Jang | 379/198 |
| 5,438,612 | 8/1995 | Norimatsu | 379/192 |
| 5,509,067 | 4/1996 | Murata | 379/200 |
| 5,745,555 | 4/1998 | Mark | 379/93.03 |

*Primary Examiner*—Scott Wolinsky
*Assistant Examiner*—Benny Q. Tieu
*Attorney, Agent, or Firm*—Gunn & Associates, P.C.

[57] ABSTRACT

The present apparatus is a device interposed between a phone set and a telephone jack. It is secured by a lock and hasp to a post or frame member so that it overshadows and prevents access to a conventional telephone jack and the wall plate surrounding the jack. When locked in place, and connected serially between the phone set and the telephone line, it includes the user to input a PIN number, and to thereby make calls to specified telephone numbers (one or more). A field in memory stores unique PIN numbers for the users and calls numbers, and keeps track of available time not yet used by the N users. By decrementing with each call, the elapsed total time can be tracked. Charges can be controlled by limiting the authorized telephone numbers.

25 Claims, 2 Drawing Sheets

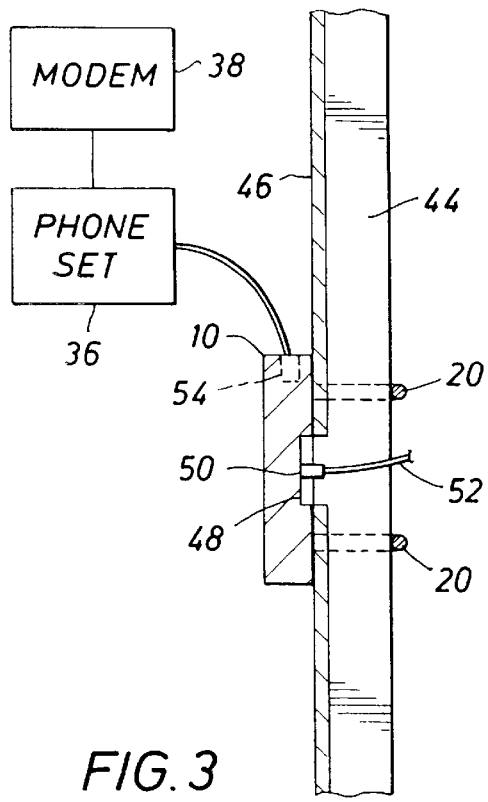
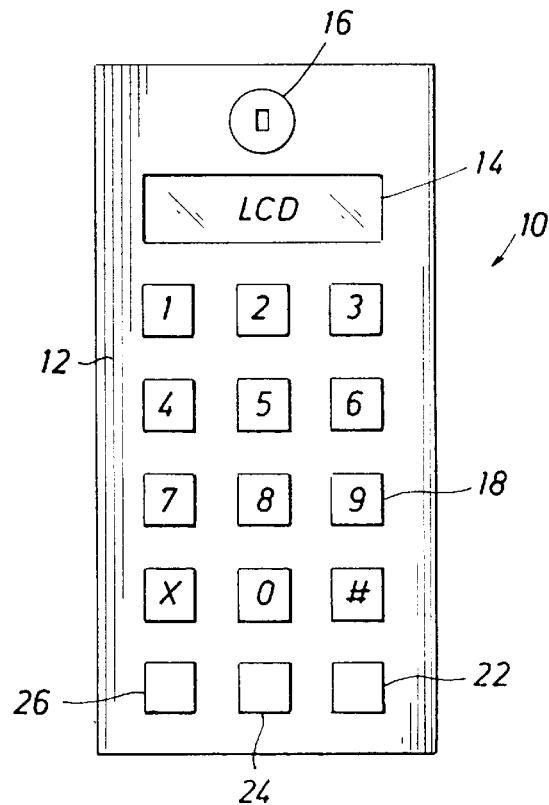
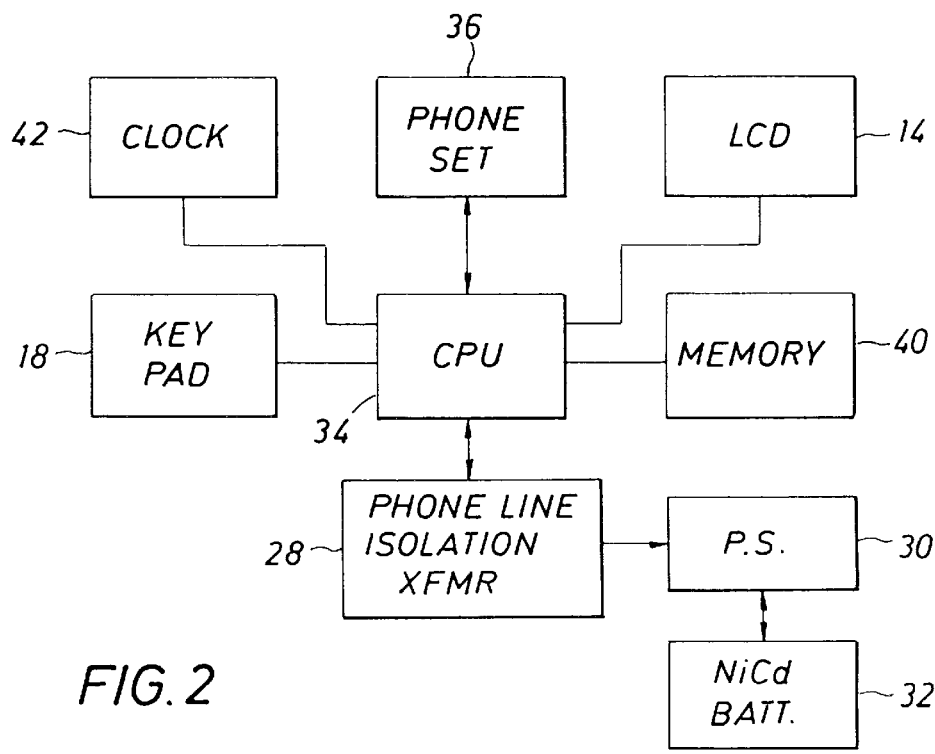
FIG. 1
FIG. 3
FIG. 2

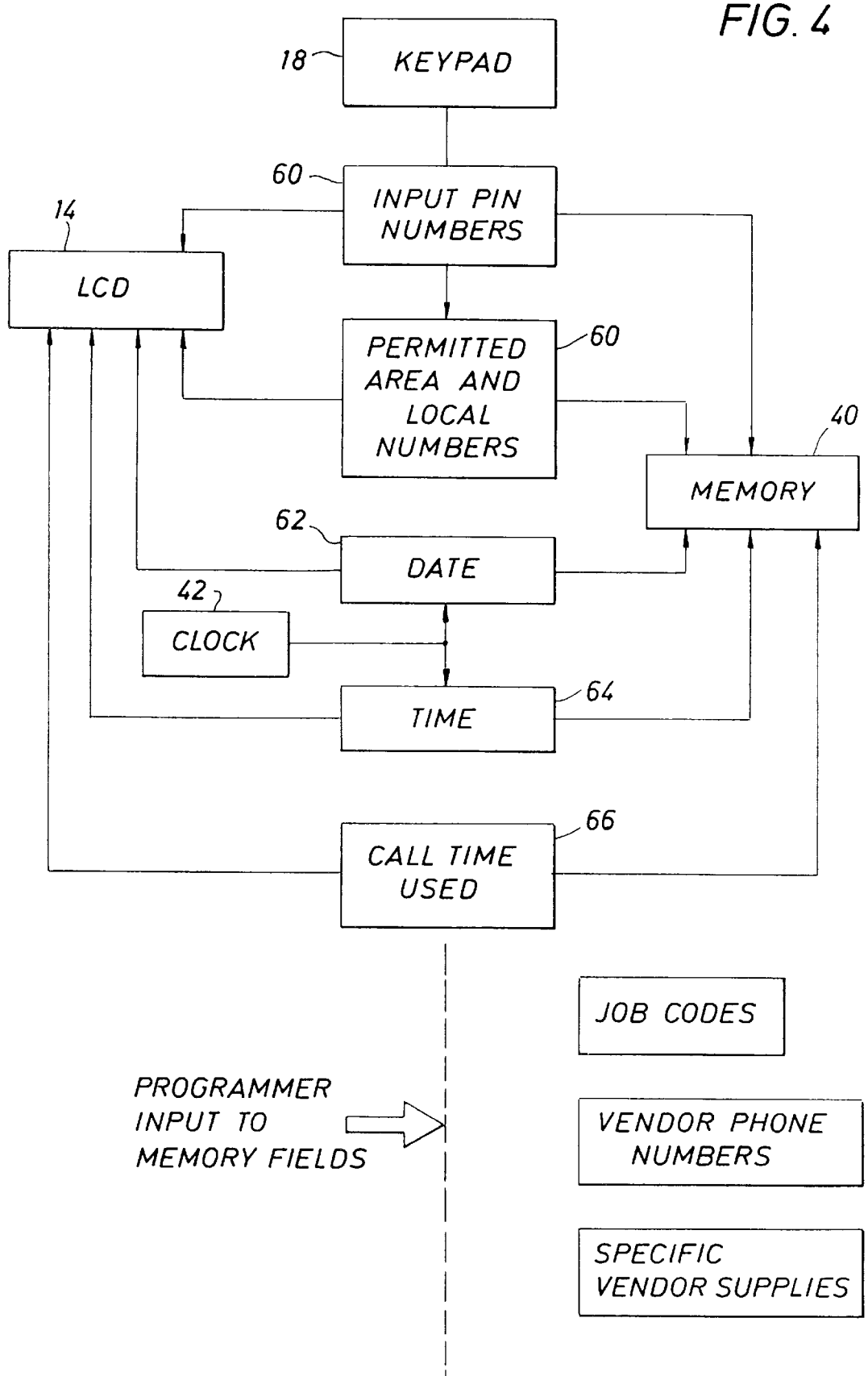

TELEPHONE ACCESSORY INCORPORATING DEMAND METER FOR MULTIPLE USERS

BACKGROUND OF THE DISCLOSURE

The present disclosure is directed to a telephone attachment which is particularly able to be installed at a convenient location for a large number of temporary users. It is especially intended for a large number of users who might be assigned to a building location near the telephone for a few days. An example will be given with regard to a manufacturing site, another example will be directed to a construction site, and another example will be directed to a summer camp.

Take the example of a summer camp which has a number of campers in a dorm room. Assume that the number is forty. Assume also that they are going to be in the dorm room together for ten days. The device of this disclosure helps overcome several of the problems common to such summer camps. Generally, it is desirable that the campers not bring cash into the dorm room. At best, it gets spent on things which detract from the purpose of the camp, and at worse, it gets misplaced, lost or stolen. Borrowing will occur without any pay back. It is better that telephone calls from the camp be handled by some sort of credit or calling card transaction. The problem with that is that the campers often are quite young and should note entrusted with that sort of financial capability. Again, the calling card may be lost or misplaced. In another aspect, it is desirable that the campers call home at least periodically over the span of a ten day trip. It is desirable that they call but not talk very long. It is also desirable from the point of view of the families that they hear from them on a fairly regular basis. The present system enables an allocation of time for each of the forty campers for ten days. When the first group of campers leave, the equipment can then be reset so that a second set of campers can then use it, again, assumed to be forty campers for ten days. While the pattern may vary somewhat in detail this is especially true for summer recreational camps, scout camps, church camps, band camps and so on. It also finds application even for older students such as those who work in the national forest and the like. In all instances, it is desirable that they be able to make the calls without a lot of difficulty. It is desirable again that they be permitted to call home without cash. The present invention enables this to be done readily.

Consider a job erection site. Assume that a housing development involves eight houses at the end of a cul de sac or in a common local. At various times of the day, different craftsmen will be there. This may include a foundation crew including a truck driver delivering a truck load of cement, all of this occurring at one house site, a carpentry crew framing the building at the adjacent site, and plumbing and electrical subcontractors at the next job site. At the next adjacent site, a roofing crew may be installing the roof, gutters and other exterior components. Internal finish personnel including glaziers, trim carpenters, cabinet makers and terrazzo craftsmen may be in one house. In that instance, it may be necessary for any number of the craftsmen to go to a local telephone, make calls for replenishment of supplies, to make calls to their base dispatchers so that they can then sign out from that project and go to another location, to make calls indicating a shortage of labor or materials, and to otherwise advise the project owner. It may be necessary from time to time to talk with the architect to evaluate changes in the drawing that will have to be made dynamically. The phone is left in the open so that, after evening falls, the telephone set might otherwise be used by those who stumble over the facility and make long distance phone calls charging them to the economic harm of the telephone line subscriber. A number of problems can arise of this sort. The problems are substantially limited only by the imagination of the telephone users. Unwanted calls to 900 numbers can be made. Unwanted calls to remote area codes resulting in large toll charges might occur also. All of these can be screened by the present apparatus.

The device of this disclosure enables a finite number of users to use the telephone. The number is a whole number integer and is represented by the symbol N. Each of the N users is provided with a specified time of calling. The time is represented by the symbol T. The time allocated to one of the set of N users will be represented symbolically by $T_1$, $T_2$, and so on. Moreover, the telephone calls can be screened at least by destination. For instance, the calls can be screened so that outbound calls are forbidden to area code 900. It is also possible to limit the called numbers to that immediate locale. That is normally described as a local area code in the larger cities (Chicago, Detroit), while in some instances, the permitted phone calls will be identified as a particular exchange within an area code. In all instances, the list of permitted telephone numbers can be quarantined so that the list is short, i.e., is limited to those who have a need to receive the calls where the tolls involved with the call can be known in advance. Consider again as the example of a residential construction site on the edge of a city. Generally, all the calls required from that site are into the city. Permitted phone numbers are those which are within the city, but not elsewhere. Consider, however, the instance where a number of young campers (typically age 10 to 15) are bused a long distance to a camp in another state. Assume for purposes of description that they are bused to a camp in the Ozarks which is located at area code (501) and that they have traveled from St. Louis which is area code (314). Assume also that the camp operators and the parents have decreed that the young campers should be calling home only. When they call, they are able to call only their family. In that instance, the arrangement can be made readily before they arrive so that each is allocated a specified set of telephone calling instructions. Each is given their own personal identification number (PIN) and the PIN is assigned to each of the N campers. Associated with a particular PIN number, each camper provides their home phone number which might be, in this example, in the greater St. Louis area or a number at area code (314). Thus, a particular camper might be given the PIN number of 22 which, when input to the system, provides a call to his family so that a speed dialing protocol is initiated which calls his family at 1-(314)-123-4567. In that example, loading the PIN number prompts the call.

Typically with young campers, it is desirable that they not talk very long but make a daily call. Thus, if they are going to be at camp for ten days, they might be allocated four minutes per day. This encourages them each to make a call but for only four minutes. They can be told in advance and make the call between specified hours. Assume that the campers are busy with the camp activity and have no free time until the evening hours of 5:00 to 8:00 p.m. Utilizing a clock in the apparatus, the equipment can be enabled for that three hour interval, an interval of 180 minutes. Assuming that N equals forty and each camper is allocated four minutes per call, that means 160 minutes of outbound calls can be made in that 180 minute interval. This allows about twenty minutes between calls so that the campers can pass the phone set from one to the next to the next. It may be desirable that the campers be locked out at other hours, i.e., they should not be permitted to call in the middle of the night. They should also be involved in camp activities in the middle of the day, and that time interval might be locked out also.

Consider by contrast the remote construction site mentioned above where six residential houses are being constructed in a continuous location. A telephone is installed at that location. Each craftsman who comes on the job site is given a PIN number. They are assigned the numbers at different dates and they are included at different dates. For instance, the foundation crew will be excluded first, while the roofers will be included later. At the start of the project, there is no need for roofers to be at the premises; therefore, they get their PIN numbers later. In these instances, the roofers and other craftsmen may be given a PIN number which is unique for calling only their home dispatcher, ie., the roofers call the roofing company. By contrast, they may be short of supplies and a couple of other numbers can be added to the list such as authorized stores which sell construction goods and equipment on demand for the job site can be designated. In this instance, where charge accounts have been opened for the particular construction site, these charge account vendors can be identified and particular speed dial numbers can be provided for them so that they can be called and quick dispatch of limited quantities of goods can be achieved. Consider as an example that the carpentry crew is framing a structure but it discovers that it is short a particular precut window frame. That can be ordered as soon as they determine that fact. The order can be transferred orally along with some identification codes over the telephone line which enable precise idenitification of the calling party, the job site, the particular item needed by part number or other nomenclature. This will enable the dispatch of the particular shorted merchandise. If the call is made early in the day, it might be possible to get it delivered that day or at least by the next morning. This will enable the work crew to continue working steadily without interrupting and having to run to the lumber yard or to other vendors to get materials where they are simply short of materials. Accordingly, the work crew can be instructed with individual PIN numbers, and can be provided with confidential account code(s) in the form of speed dial numbers. The speed dial numbers can be added so that the proper verification information can be transferred. This assures that charges are allocated to the right account for a particular construction project.

Proceeding further, the device of the present disclosure enables call tracing so that time and billing expenses can be captured also. Consider as an example the construction project just mentioned. When the project inspector or architect is on site, the architect may spend different amounts of time at each site. The architect is then permitted to call in and provide a billing code at the home office. The job site may include six different houses, each of which has a different billing code. The architect is permitted to call in and directly input data regarding time and billing charges. This can be simply an entry that the architect spent 0.3 hours (or 18 minutes) on a particular house lot. Then again, the architect may spend 2.0 hours at another house under construction and also make a number of special changes to the construction plan which are agreed on dynamically in the field. For instance, the architect may decide on the spot that the project really would do better with the addition of a 42,000 BTU AC unit, not a 36,000 BTU unit. While the cost may be substantially the same from the installation point of view, the added charges may be necessary so that that information can be transferred for added cost in the construction of the particular house. In other words, cost allocation is wisely made.

In one aspect, the equipment of the present disclosure is installed and used for a season and then removed. The season may be the camping season of just the summer months. In a construction situation, the season may be the construction time required to build out and complete ten lots with ten finished houses ready for occupancy. In that instance, it might require the greater portion of a year depending on the scheduling of the work crews. Also, it may be subject to seasonal delays as occur in the northern states.

The mode of attachment is an important factor. The mode of attachment involves locking with a key lock on an attachment loop. The attachment loop is affixed to the back of the equipment and extends beyond the equipment to encircle a post or column. It typically is constructed so that it fastens to a post over all industry standard connector. The industry standard connector typically represents a wiring termination which is recessed internally within the box. The box houses the screen which displays events and transactions on the front and is all LCD display. A twelve button key pad in accordance with typical telephonic equipment is included. The key pad is used for entry of data. A programming package is stored in the memory within the box which is communicated with the CPU. Electrical power is from a long life storage battery such as a nickel cadmium battery. The NiCd battery is provided with a trickle charge from a power supply. The power supply takes current flow at the rate of two or three milliamperes from the line so that it can keep the equipment charged even in the event of line power loss. This equipment enables the device to function for long intervals even with periodic expenditures of energy. The box enhances security because it fastens over the mounting plate. The mounting plate is covered or obscured by this equipment.

The disclosed system of the present disclosure is briefly summarized as a portable, field installed, lock protected secure box including equipment within and interposed between a telephone set and the telephone line. It accomplishes the tasks which are set forth below which includes user time allocation, job costing and accomplishes this under control of a programmer who loads a set of PIN numbers. In summary, it is installed, used for a while and then can be removed and optionally moved to another location.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 1 is a plan view of the box showing the face of the box enclosing the equipment of the present disclosure and illustrating a key pad with an LCD display;

FIG. 2 is a schematic block diagram of the circuitry of the telephone apparatus of the present disclosure illustrated in FIG. 1;

FIG. 3 is a side view showing the box of the present disclosure temporarily and securely mounted on a wall to intercept and control telephone traffic through a phone set; and FIG. 4 is a flow chart of program events.

DETAILED DESCRIPTION OF THE PREFERRED EMBODIMENT

Attention is now directed to FIG. 1 of the drawings where the numeral 10 identified the equipment of the present disclosure. It will first be described physically but the more important aspects of the disclosure will focus on the circuitry which is found in the equipment 10. That is detailed in FIG. 2. Proceeding therefore with FIG. 1, it is a generally rectangular box structure of substantial and durable materials. The cabinet 12 is constructed of heavy gauge heavy duty metal or reinforced plastic. It incorporates an LCD display 14 which is divided into three regions. The three regions display a specified number of digits as will be described. The display is particular useful in that it provides quick feedback to the user. The numbers in the display are sufficiently large that they illustrate particular codes to the user so that the user is properly and timely informed. The box 10 includes a key lock mechanism 16 which shows the key cylinder in FIG. 1. It is rotated to release. On release, it disconnects a U-shaped bar 20 shown in FIG. 3 of the drawings. The bar 20 is a U-shaped bar which functions as the hasp of a conventional key or combination lock. In this instance, it is made with a relatively deep throat so that it can reach around a post including encirclement around a typical 2×4. It latches on the 2×4 so that it can be held in position. This however will be described in greater detail in FIG. 3 which illustrates the cabinet or box 12 mounted fixedly on a 2×4 or other frame member. This assures security of the box. Indeed, FIG. 3 shows the device to incorporate two of the hasps so that it can lock at both ends. This assures anchoring of the device to overshadow a wall plate of industry standards.

Returning to FIG. 1, there are twelve buttons at 18 which define the key pad. The key pad is of conventional construction with other telephone sets. There are twelve keys intended for use by a typical subscriber or user. For a programmer, there are three extra keys which are provided. The key 22 is entitled PROGRAM and the key 24 is an ENTER key. A CANCEL key 26 is also included. These three keys enable a programmer to provide appropriate instructions to the system.

Shifting now to FIG. 2 of the drawings, the system is intended to be used with a typical telephone line. Input to the system is therefore accomplished through a phone line isolation transformer 28. The transformer 28 draws off a small current of about one or two milliamperes to a power supply 30. That stores charge on a NiCd battery 32 for operation. The power supply and battery keep the equipment operative even with current interruptions. The phone line isolation transformer in addition routes the dial tone and other audio data to the CPU 34. The CPU sorts two sets of data. The audio or voice data along with ringing is output to a conventional phone set 36. The phone set 36 operates in the ordinary fashion. The phone set 36 will be discussed in some detail on development of an example of installation mechanically illustrated in FIG. 3 of the drawings. The apparatus of FIG. 2 also includes the key pad 18 previously noted. The CPU operates in conjunction with a memory 40. The CPU provides signals for the LCD 14. It is important that the equipment operate in accordance with the clock illustrated at 42.

Going momentarily to FIG. 3 of the drawings, this view shows the equipment 10 installed so that a group of campers can call home without requiring coins or toll charges and the like. First, it is shown and illustrated installed on the wall of a building. The building wall is constructed with a 2×4 frame member 44. A wall covering such as sheet rock 46 is placed on the exterior. In turn, that is provided with a conventional wall mounting plate 48 which includes the traditional receptacle for a telephone jack 50. The jack 50 has the form of a receptacle which accepts the industry standard fitting. The plate on the wall has the standard width and height of about 3 by about 4.5 inches. The receptacle 50, being an industry standard, enables connection with a telephone line 52 which extends to a telephone system. The box 10 of the present disclosure incorporates a conventional receptacle 54 which enables the phone set to be connected to it. Because the circuitry shown in FIG. 2 is interposed between the phone set 36 and the telephone line 52, it controls operation of the telephone line.

To provide the context of the structure shown in FIG. 3, assume that forty young campers arrive at a summer camp and are housed in a dormitory. The phone set 36 is installed with this invention 10 and it is typically located at a central location, out of the bad weather, and located for use by the forty campers. In an example given earlier, assume that the camp is area code (501) and all the campers come from the St. Louis area which is area code (314). Assume that the campers are to be at the camp for ten days. The campers can provided with their own PIN number which in this instance will arbitrarily be numbers between one and forty. Table I below is an example of the activity recorded for a particular camper. Table I shows the several entries. Thus the camper is permitted to use the telephone between specific hours. The hours are typically in the afternoon or evening hours such as 5:00 to perhaps 8:00 or 9:00 p.m. The camper must dial in his PIN number. Through the operation of the clock 42, the date is captured and is shown in Table I as a Julian date entry. The time of the call is recorded in the third column. By preprogamming, and by making a connection between the PIN number 36 and the number to be called, namely, the family of the camper, the PIN number is thus associated with the home number, meaning (314) 123-4567. That number is entered for the camper. The call duration is entered in Table I in the next column and the time remaining for the camper is also recorded in the last column.

TABLE I

| PIN | DATE | TIME | NUMBER CALLED | CALL DURATION | TIME REMAINING |
|-----|------|------|---------------|---------------|----------------|
| 36 | 210 | 18:20 | 123–4567 | 3.0 | 37.0 |
| 36 | 211 | 18:48 | 123–4567 | 4.0 | 33.0 |

The tabular data in Table I is a representative set of data for one camper. As will be understood, with forty campers, there will be forty sets of data accumulated over the ten days of camp. All the data will have the same organization and format as shown in Table I. Indeed, Table I is shown where the PIN number permits only a call to the family of the camper. This arrangement of PIN number and called number is typically done for younger campers. In other instances, it may be appropriate to permit the campers to call area codes which are permitted in the system. Older campers have the option of using the phone set 36 to dial in the area code and the call number. Accordingly, the camper would first enter their individual PIN number and then the called number. After entry of the PIN number, the program operates to provide a called number (his family) on the screen. The program then dials the digits for the called number beginning with the area code and then the local number. As a precaution for controlling cost and to prevent one camper tying up the telephone system, a short list of permitted area codes and/or local numbers can be loaded. For older campers to call other family or friends, the camper may dial in the number. Indeed, the permitted area codes and numbers can be initially provided by the campers. Typically, if the campers all come from the same locale, the number of permitted area codes might be 2 or 3, but typically not the entire country. Continuing, the last two columns of Table I decrement the initial allocation of time. In summary, this total time is loaded at the start of the camp and is reduced as the campers finish the camp. Making a consistent allocation as noted, perhaps four minutes per day, the campers are encouraged to call home daily but long conversations are not permitted. As the time decrements toward zero, that also can be displayed on the LCD 14.

The user of the phone set normally need only dial through the phone set. The phone set is equipped with a conventional 12 keypad. That is the pad normally intended for the user. To this end, the phone set is typically installed on the end of a cord of perhaps 5 to 15 feet in length. Generally, it is not desirable that the user actually keyboard numbers through the keyboard 18. That keyboard 18 is furnished for entry of program data such as a set of PIN numbers. That is also used for inputting other data as required. In general, that is located at a more inconvenient location, i.e., mounted on the wall and perhaps obscured from view. It is desirable that the accessory 10 be affixed so that the LCD display is readily seen. The visible LCD display is the only aspect of the device 10 that interacts with the users. The users preferably keyboard entries in the ordinary fashion. For instance, the phone set is furnished with an on/off switch hook. When the phone set is lifted, the line is seized, and the user can then begin transmitting data. Typically, the user will then input the PIN number, reading the display if it is within sight. Thereafter, the user is either directly connected to the called number (a particular called number for each PIN number), the ideal method of assuring that young campers call home. The user is typically also provided with a visual display which signifies the time remaining on the call and other details like that. Generally, therefore, it is not necessary that the user input any data through the keypad on the box. That input is generally reserved for the person setting up the equipment 10, typically provided with an instruction booklet which tells them how to load the PIN number for forty campers, thirty craftsmen at a construction site, etc. In summary, there is no basis for operation of the keypad on the box 10 when the user normally has the conventional keypad on the phone set 36. To the user, the phone set 36 operates in the ordinary fashion except in the sense that use is limited as described above. The user can take the phone set off hook, input the PIN number and then make calls accordingly.

Assume another situation altogether. Assume that FIG. 3 shows a post at a construction site of ten lots and ten houses will be erected by a single contractor The post is installed at a central location to the ten houses. Typically, the point of installation is protected from inclement weather. As an example, the construction project may begin by erecting a detached garage on one house lot to serve as a storage shed for materials to be protected from bad weather. The telephone line 52 may be installed to the interior of the garage, and equipment shown in FIG. 3 is installed there temporarily. As each workman is assigned to the crew, they are given a PIN number. Table II shows a representative set of entries. A particular workman is provided with the PIN number 77. Prior to even dialing the number of the supply store, lumber yard or other vendor, in accordance with prompts from the LCD 14, this particular workman can input a billing code number such as 127. The quantity of that item is then input. The next input is the particular house lot such as Lot No. 3. The equipment 10 captures the time and date. All of this can be input prior to making a telephonic order. The telephonic order is then made by dialing the seven digit local number for the vendor in question. Upon speaking with the telephone personnel at the vendor, the construction worker can then download to the vendor the data just mentioned, namely, that six units are wanted for Lot No. 3. The particular units wanted are the items with the Billing No. 127. That might be lumber, roofing shingles, pipe or other materials depending on the craft or trade of the particular construction person.

TABLE II

| PIN | BILLING | QUANTITY | JOB | TIME | DATE |
| --- | --- | --- | --- | --- | --- |
| 77 | 127 | 6 | 3 | 9:40 | 233 |
| 64 | 156 | 2 | 3 | 10:52 | 233 |

By making this telephone equipment available, costing information for the ten houses under construction can be captured. Convenience is enhanced because expensive, highly paid construction personnel are not driving off to make pickups, and the data can be transferred out quickly. Indeed, the calling party can readily make requests using a short check list. There is no need, however, for carpentry crews to have a supply list of plumbing or electrical supplies. Thus, the billing code numbers can be assigned by craft to the particular craftsman, this enables the proper vendor to be called also. While a single vendor may supply all the supplies required at the job site, it typically involves any number of vendors. To that end, the vendors can be provided with matching lists so that the billing code numbers are correlated to the goods and merchandise offered by a particular vendor and ordered by the craftsman.

Control of the telephone 36 can be tailored to the more sophisticated need described in the construction situation just mentioned. Attention is now directed to FIG. 4 which is a flow chart of events which occur with the system. Briefly, the programmer accesses the equipment 10 and inputs the PIN number(s) through the key pad 18. That is shown in the step 60. The next step in the sequence is to input the called numbers at permitted area (local numbers) which is identified by the step 60. All the while, the clock 42 will operate so that the correct date is available at 62, and the time of a particular call is available at 64. In addition, the total time used by each particular PIN number is illustrated in the step at 66. That is a cumulative or running total of the time used, or alternately, of the call time which remains as it counts toward zero. The date and time steps are dependent on the operation of the clock 42. The time and date numbers are output to the LCD display.

The display 14 optionally also displays the called number including area code and local number and the PIN number. Depending on the digits required, the LCD can have one or more fields, the preferred being three fields. The three fields typically provide the individual PIN numbers, and the called number at the time of calling. Thereafter, they preferably provide the date, time of day and the duration of the call. The latter is dynamic to the user so the user can monitor their own telephone traffic. This enables the user to particularly monitor the allocated time and terminate before time expires. For a set of campers, the equipment preferably disconnects the telephone call at a specified moment. To avoid surprise, the campers are preferably warned that a call duration of four minutes will be the norm, and that the equipment will disconnect at five minutes. While other examples can be developed of this, it is disciplinary of the numerous campers who must share a single phone set so that all can get access to it.

The flow chart of FIG. 4 shows an optional addition, i.e., the preliminary input by a programmer in the memory fields. The preliminary input is especially useful for a job site. In the example developed earlier where construction is going on at ten contiguous house lots, the house lots can all be numbered with unique job codes. The vendor phone numbers are loaded. The phone numbers are those for the particular vendors who are identified for that project. The third list is the list of specific vendor supplies that can be acquired by telephone. That need not be everything required for the project, but it can be a number of items specific to a job site. As before, the vendor supplies must be specific to the particular craftsman. Quite obviously, additional lumber is not normally required by the plumber. Accordingly, lists of plumbing supplies and electrical supplies are compiled and recorded in memory. They are, however, specifically accessible only by the respective craftsmen dealing with that area. By allocating job codes, vendor phone number and specific vendor supplies into designated groups, and by qualifying particular PIN numbers for particular fields of data, purchasing is controlled so that the person on site having the best knowledge regarding the need for added supplies will be able to make a purchase of those supplies, but not others. In addition, the PIN number access of the programmer input fields shown in FIG. 4 is reinforced by recording in memory the dialed transactions. Again, using ten house lots as an example, as many as twenty or thirty calls may be made from the construction site during the day. The calls are captured in memory along with the data which is at least reflected in Table II. It may be helpful to additionally capture the data including date and time of day. The PIN number is also captured along with the called number. In summary, all of this is captured and can be retrieved from memory periodically. This enables a construction site to make job costing allocations. Over the span of a month, as many as 200 or 300 calls might be made which order additional supplies. The job costing data requires the allocation of the supplies to the ten particular houses being built; the captured data is important to obtain proper costing information. More specifically, the programmer loads the data as shown in FIG. 4.

While the foregoing is directed to the preferred embodiment, the structure is determined by the claims which follow.

I claim:

1. A control system to be interposed between a phone set and a telephone line to control operation of the phone set and comprising:
   (a) A detachable, serially connected control circuit housed in a box;
   (b) a memory in said box to receive input data comprising acceptable Personal Identification Numbers (PIN);
   (c) a memory for receiving a set of acceptable phone numbers to be identified by a user first inputting a PIN wherein the acceptable numbers are limited to a list stored in said memory;
   (d) a circuit in a seized connection between the phone set and the telephone line so that a number called by said PIN qualified user is permitted and
   (e) a clock connected to a time of day and day of year register to provide time and date of telephone use by said PIN.

2. The apparatus of claim 1 including a memory having a field for loading N said PINs into said memory field, and further including N time intervals for authorized calls through the phone set by the N PIN users.

3. The apparatus of claim 1 wherein the telephone set includes an on/off hook signal to enable a user to input thereafter said PIN and other numbers which are exclusively authorized pursuant to PINs and numbers stored in respective fields in memory.

4. The apparatus of claim 1 where an individual user is assigned said PIN, and is provided with an authorized aggregate telephone operating time and said operating time is a number stored by PIN user for N users and the amount of time there is decremented to zero.

5. The apparatus of claim 1 including a CPU and cooperative memory wherein the memory has an input for:
   (a) a user PIN for up to N users;
   (b) a user associated list of qualified telephone numbers;
   (c) a user related list of time intervals for calling over a specified interval; and
   (d) a memory field for telephone users identified by unique PINs for N users of the total time of telephone use still permitted.

6. The apparatus of claim 1 including a CPU and associated memory and said memory has fields assigned to receive:
   (a) user PINs for up to N users;
   (b) called vendor numbers identified by number wherein each user has access to at least one vendor number;
   (c) unique purchased item identifying numbers stored in a field wherein each of said vendors has at least one item therein; and
   (d) a field for receiving and storing job numbers uniquely assigned to activities of the N users of the PINs.

7. A telephone control system for installation between a phone set and a telephone line wherein the phone set normally connects with the telephone line at an industry standard connection comprising:
   (a) a box for the telephone control system having a telephone line connection;
   (b) a lock for securing the box fixedly over the telephone line connection;
   (c) a connection into the box to enable the phone set to be connected to the box so that the box is interposed operatively between the phone set and the telephone line;
   (d) a PIN (personal identification number) list stored in a memory within the box to enable users to input a PIN assigned uniquely to identify users for operative connection from the phone set to the telephone line on qualification of the PIN input by the user;
   (e) programmable operational parameters stored in the memory within said box which control and track said operative connection; and (f) a circuit in a seized connection between the phone set and the telephone line so that a number called by the PIN qualified user is permitted and recorded under conditions defined by said operational parameters.

8. The apparatus of claim 7 including a lock operated security connection to fixedly anchor the box with respect to the telephone line connection.

9. The apparatus of claim 8 including a key operated lock cylinder for unlocking so that the box is releasably secured over the telephone line connection.

10. The apparatus of claim 7 wherein said box installs over said telephone line connection and said telephone line connection includes a receptacle in an industrial standard wall plate, and said box fits thereover and obscures said receptacle so that access to the receptacle is forbidden.

11. The apparatus of claim 7 including a U-shaped locked member connected with said box and adapted to extend around a post or frame member so that said box is anchored in position.

12. The apparatus of claim 7 wherein said box is closed and self-contained and incorporates therein an interposed circuit between said phone set and telephone line that controls user access through the telephone line, and wherein said self-contained box prevents access to the telephone line.

13. The apparatus of claim 12 wherein said box encloses an internal power supply.

14. The apparatus of claim 12 wherein said box incorporates a visible, readable, external display providing information to a user.

15. The apparatus of claim 14 wherein said box incorporates a key pad for inputting of data.

16. A control system to be interposed between a phone set and a telephone line to control operation of the phone set and comprising:
   (a) A detachable, serially connected control circuit housed in a box;
   (b) a memory in said box to receive input data comprising acceptable PIN (personal identification number) identifying users;
   (c) a memory for receiving a set of acceptable phone numbers to be identified by the user first inputting a PIN wherein the acceptable numbers are limited to a list stored in said memory;
   (d) programmable operational parameters stored in the memory for use of said phone set; and
   (e) a circuit in a seized connection between the phone set and the telephone line so that a number called by the PIN qualified user is permitted and recorded under conditions defined by said operational parameters.

17. The apparatus of claim 16 including a memory field storing a list of acceptable PINs.

18. The apparatus of claim 17 wherein said PINs are associated with unique called telephone numbers including area code and local number.

19. The apparatus of claim 18 wherein PINs are uniquely associated with a memory stored list of acceptable called numbers and acceptable identification numbers transmitted through said PIN numbers qualification.

20. A control system to be interposed between a phone set and a telephone line to control operation of the phone set and comprising:
   (a) A detachable, serially connected control circuit housed in a box;
   (b) a memory in said box to receive input data comprising acceptable PIN (personal identification number) and including a memory field for loading N PINs into said memory field, and further including N time intervals for authorized calls through the phone set by N PIN qualified users;
   (c) a memory for receiving a set of acceptable phone numbers to be identified by a user first inputting a PIN wherein the acceptable numbers are limited to a list stored in said memory;
   (d) programmable operational parameters stored in the memory for use of said phone set; and
   (e) a circuit in a seized connection between the phone set and the telephone line so that a number called by the PIN qualified user is permitted and recorded under conditions defined by said operational parameters.

21. The apparatus of claim 20 including a clock connected to a time of day and day of year register to provide time and date of telephone use by PIN.

22. The apparatus of claim 20 wherein the telephone set includes an on/off hook signal to enable a user to input thereafter said PIN number and other numbers which are exclusively authorized pursuant to PINs and numbers stored in respective fields in memory.

23. The apparatus of claim 20 where an individual user is assigned one said PIN, and is provided with an authorized aggregate telephone operating time and said operating time is a number stored by PIN user for N said users and the amount of time there is decremented to zero.

24. The apparatus of claim 20 including a CPU and cooperative memory wherein the memory has an input for:
   (a) said user PIN for up to N users;
   (b) a user associated list of qualified telephone numbers;
   (c) a user related list of time intervals for calling over a specified interval; and
   (d) a memory field for telephone users identified by unique PINs for N users of the total time of telephone use still permitted.

25. The apparatus of claim 20 including a CPU and associated memory and said memory has fields assigned to receive:
   (a) said user PINs for up to N users;
   (b) called vendor numbers identified by number wherein each said user has access to at least one vendor number;
   (c) unique purchased item identifying numbers stored in a field wherein each of said vendors has at least one item therein; and
   (d) a field for receiving and storing job numbers uniquely assigned to activities of the N users of the PINs.

* * * * *